US 6,639,980 B1

(12) United States Patent
Weiss et al.

(10) Patent No.: US 6,639,980 B1
(45) Date of Patent: Oct. 28, 2003

(54) ADAPTIVE RULE-BASED MECHANISM AND METHOD FOR FEATURE INTERACTION RESOLUTION

(75) Inventors: Michael Weiss, Ottawa (CA); Tom Ware, Ottawa (CA)

(73) Assignee: Mitel Corporation, Kanata (CA)

( * ) Notice: Subject to any disclaimer, the term of this patent is extended or adjusted under 35 U.S.C. 154(b) by 0 days.

(21) Appl. No.: 09/518,555

(22) Filed: Mar. 3, 2000

(30) Foreign Application Priority Data

Mar. 5, 1999 (GB) .............................................. 9905156
Aug. 23, 1999 (GB) .............................................. 9919941

(51) Int. Cl.[7] .............................................. H04M 3/42
(52) U.S. Cl. .......................... 379/201.02; 379/201.03; 379/201.05; 379/201.12; 379/207.02
(58) Field of Search ........................ 379/201.01, 201.02, 379/201.03, 201.05, 201.12, 207.02

(56) References Cited

U.S. PATENT DOCUMENTS

| 5,337,351 A | * | 8/1994 | Manabe et al. | 379/201.02 |
|---|---|---|---|---|
| 5,404,396 A | * | 4/1995 | Brennan | 379/201.05 |
| 5,448,631 A | * | 9/1995 | Cain | 379/201.01 |
| 5,657,451 A | * | 8/1997 | Khello | 379/201.03 |
| 5,717,747 A | * | 2/1998 | Boyle et al. | 379/201.03 |
| 5,742,673 A | | 4/1998 | Khello | 379/201.03 |
| 5,796,950 A | * | 8/1998 | Sips et al. | 709/218 |
| 5,822,419 A | * | 10/1998 | Enstone et al. | 379/201.03 |
| 5,878,128 A | * | 3/1999 | Kantola | 379/230 |
| 5,920,618 A | * | 7/1999 | Fleischer et al. | 379/221.09 |
| 5,999,610 A | * | 12/1999 | Lin et al. | 379/207.02 |
| 6,141,407 A | * | 10/2000 | Fritsche | 379/201.01 |
| 6,167,126 A | * | 12/2000 | Janning | 379/201.12 |
| 6,201,860 B1 | * | 3/2001 | Kullstrom et al. | 379/201.01 |
| 6,445,782 B1 | * | 9/2002 | Elfe et al. | 379/201.01 |
| 6,526,134 B1 | * | 2/2003 | Wallenius | 379/201.01 |

FOREIGN PATENT DOCUMENTS

| EP | 0 833 526 A1 | 9/1996 | ............ H04Q/3/00 |
| GB | 2 299 730 A | 10/1996 | ............ H04M/3/42 |
| WO | WO 98/23098 | 5/1998 | ............ H04Q/3/00 |

* cited by examiner

*Primary Examiner*—Harry S. Hong
(74) *Attorney, Agent, or Firm*—Fenwick & West LLP

(57) ABSTRACT

An adaptive rule-based mechanism and method to resolve conflicting feature interactions includes the steps of determining conflicting features available for execution in response to an event; examining the conflicting features to determine whether one of the conflicting features takes priority over other conflicting features; if one of the conflicting features takes priority, selecting that conflicting feature for execution; and if one conflicting feature does not take priority, prompting the user to make a selection to resolve the conflicting feature interaction.

29 Claims, 6 Drawing Sheets

ADAPTIVE RULE-BASED MECHANISM AND METHOD FOR FEATURE INTERACTION RESOLUTION

FIELD OF THE INVENTION

The present invention relates to an adaptive rule-based mechanism and method for resolving conflicting feature interactions.

BACKGROUND OF THE INVENTION

Current communication systems provide users with a significant number of features, such as for example, call forwarding, call waiting, call hold, speed dialing etc. New features are continually being offered by telephone companies and private branch exchange (PBX) suppliers. With the availability of technology to allow features to be customized for each user, the number of actual features available to users can be nearly arbitrary. This of course makes the task of managing conflicts between features very difficult.

Indeterminacy conflicts between features occur when two or more non-mutually compatible features available to a user are to be invoked simultaneously in response to an event. For example, consider call forwarding busy (CFB) and call waiting (CW) features. Both of these features are extensions of a terminating call (TC) feature. During normal execution of the TC feature, an incoming call is rejected if an existing call is in progress. The CFB and CW features however define deviations to this incoming call handling procedure. During execution of the CFB feature, an incoming call is forwarded to another extension if an existing call is in progress. During execution of the CW feature, a warble is generated when an incoming call is received and an existing call is in progress. If a user subscribes to both the CFB and CW features and an incoming call is received when an existing call is in progress, a conflict occurs since the incoming call cannot be forwarded to another extension and answered by the called party at the same time.

The problems associated with feature interactions have been considered. See for example:

N. Griffeth, and Y. Lin, "Extending Telecommunications Systems: The Feature-Interaction Problem", Computer, 14–18, August 1993.

E. Cameron et al., "A Feature Interaction Benchmark for IN and Beyond", Feature Interactions in Telecommunications Systems, 1–23, IOS Press, 1994

D. Keck, and P. Kuehn, "The Feature and Service Interaction Problem in Telecommunications Systems: A Survey", IEEE Transactions of Software Engineering, 779–796, October 1998.

To deal with feature interaction conflicts, in some state of the art communication systems, features are assigned priorities a priori by the communication system developer. In most cases, these priorities are hardcoded into software programs. As a result, each feature must explicitly account in some part of its code, for each possible interaction with another feature. This of course requires complete knowledge of other features with which an interaction may occur. Writing code for features to account for all other features is not only a highly a complex task but virtually impossible to achieve, especially in the presence of features developed by third parties that are added to an existing communication system. This problem is exemplified by the trend towards open, component-based communication systems that allow users to develop and add their own features.

In some communication systems, precedence has been used to specify feature selection in the event of a conflicting feature interaction based on the feature with the highest priority. For example, U.S. Pat. No. 4,695,977 to Hansen et al. discloses a telecommunication system for the switching of voice and data controlled by a computer executing a nonprocedural language that allows for the explicit control of interaction between features by the program scripts executing the programs. During run time of the system, a script, whose triples implement a particular feature, can control whether or not features of lower precedence are allowed to be implemented. However, this approach does not take into account features that specialize other features. This approach also does not allow precedence lists to be established for each user reflecting that user's preferences for resolving conflicting feature interactions.

It is therefore an object of the present invention to provide a novel adaptive rule-based mechanism and method for resolving conflicting feature interactions.

SUMMARY OF THE INVENTION

According to one aspect of the present invention there is provided in a system where two or more indeterminate features can be executed in response to an event resulting in a conflicting feature interaction, an adaptive rule-based method for resolving said conflicting feature interaction comprising the steps of:

determining indeterminate features available for execution in response to an event;

examining said indeterminate features to determine whether one of said indeterminate features takes priority over other indeterminate features;

if one of said indeterminate features takes priority, selecting said one indeterminate feature for execution; and if one of said indeterminate features does not take priority, prompting a user to select one of said indeterminate features for execution thereby to resolve said conflicting feature interaction.

According to another aspect of the present invention there is provided a telephony communication system wherein a service is to be performed in response to an event, said system including a plurality of executable conflicting features representing available options which can be performed to complete said service, an adaptive rule-based method to resolve feature conflicts during performance of said service comprising the steps of:

determining the conflicting features available for execution;

examining said conflicting features to determine whether one of said conflicting features takes priority over other conflicting features;

if one of said conflicting features takes priority, executing said one conflicting feature thereby to complete said service; and if one of said conflicting feature does not take priority, prompting a user to select one of said conflicting features for execution to resolve said conflicting feature interaction and executing the selected conflicting feature thereby to complete said service.

According to yet another aspect of the present invention there is provided an adaptive rule-based mechanism to resolve conflicting feature interactions when a plurality of conflicting features can be executed simultaneously in response to an event, said mechanism comprising:

means for determining conflicting features available for execution in response to said event;

means for examining said conflicting features to determine whether one of said conflicting features takes priority over other conflicting features;

means for selecting the conflicting feature that takes priority for execution, if it exists; and means for prompting a user to make a selection to resolve said conflicting feature interaction if a conflicting feature taking priority does not exist.

According to yet another aspect of the present invention there is provided in a system where two or more indeterminate features can be executed in response to an event resulting in a conflicting feature interaction, an adaptive rule-based method for resolving said conflicting feature interaction comprising the steps of:

determining indeterminate features available for execution in response to an event;

examining said indeterminate features to determine whether one of said indeterminate features takes priority over other indeterminate features;

if one of said indeterminate features takes priority, selecting said one indeterminate feature for execution; and if one of said indeterminate features does not take priority, comparing levels assigned to the indeterminate features with the level assigned to a user associated with said event, if the level assigned to at least one indeterminate feature is above the level of the user, automatically selecting one of the indeterminate features to resolve the conflicting feature interaction; otherwise prompting the user to make a selection to resolve the conflicting feature interaction.

According to still yet another aspect of the present invention there is provided in a telephony communication system wherein a telephone call completion service is to be performed in response to a telephone call, said system including a plurality of executable conflicting features representing available options which can be performed to complete said service, an adaptive rule-based method to resolve feature conflicts during performance of said service comprising the steps of:

prompting a calling party to select one of a number of options;

determining the conflicting features available for execution;

examining said conflicting features to determine whether one of said conflicting features takes priority over the other conflicting features;

if one of said conflicting features takes priority, executing said one conflicting feature thereby to complete said service; and if one conflicting feature does not take priority, examining rules associated with a policy governing feature selection to determine if the policy rules remove one or more features from the conflict; prompting a user to make a selection from the remaining conflicting features to resolve said conflicting feature interaction; and executing the selected feature thereby to complete said service.

According to still yet another aspect of the present invention there is provided a computer readable medium including computer program code for resolving conflicting feature interactions comprising:

computer program code for determining conflicting features available for execution in response to an event;

computer program code for examining said conflicting features to determine whether one of said conflicting features takes priority over other conflicting features;

computer program code for selecting said one conflicting feature for execution if one of said conflicting features takes priority; and computer program code for prompting a user to select one of said conflicting features for execution if one of said conflicting features does not take priority thereby to resolve said conflicting feature interaction.

The present invention provides advantages in that after the adaptive rule-based mechanism is invoked, feature interactions are resolved allowing services to be performed. If desired, rules can be established to govern feature selection when the same services are to be performed in the future. Since feature interactions are resolved in an adaptive manner, different users can establish their own preferences.

BRIEF DESCRIPTION OF THE DRAWINGS

Embodiments of the present invention will now be described more fully with reference to the accompanying drawings in which:

FIG. 2 shows user level priorities in the communication system of FIG. 1;

DETAILED DESCRIPTION OF THE PREFERRED EMBODIMENT

The present invention relates to an adaptive rule-based mechanism and method for resolving feature interactions in environments where two or more available indeterminate features can be invoked simultaneously in response to an event resulting in a conflict. The present invention is based on a separation between the policy and mechanism of feature execution. The policy provided by the feature execution environment detects and resolves known or potential feature interactions. The policy is generic inasmuch as it requires no internal knowledge of the mechanisms. It only requires that features implement a common set of methods or functions by which the policy can ask a feature, for example, whether it is applicable in a given situation, and which features extend it. A system with policy-mechanism separation can accordingly deal with the requirements of an open evolving system. For the sake of clarity, an embodiment of the adaptive rule-based mechanism in accordance with the present invention implemented in a telephony communication system will now be described.

Figure 1:
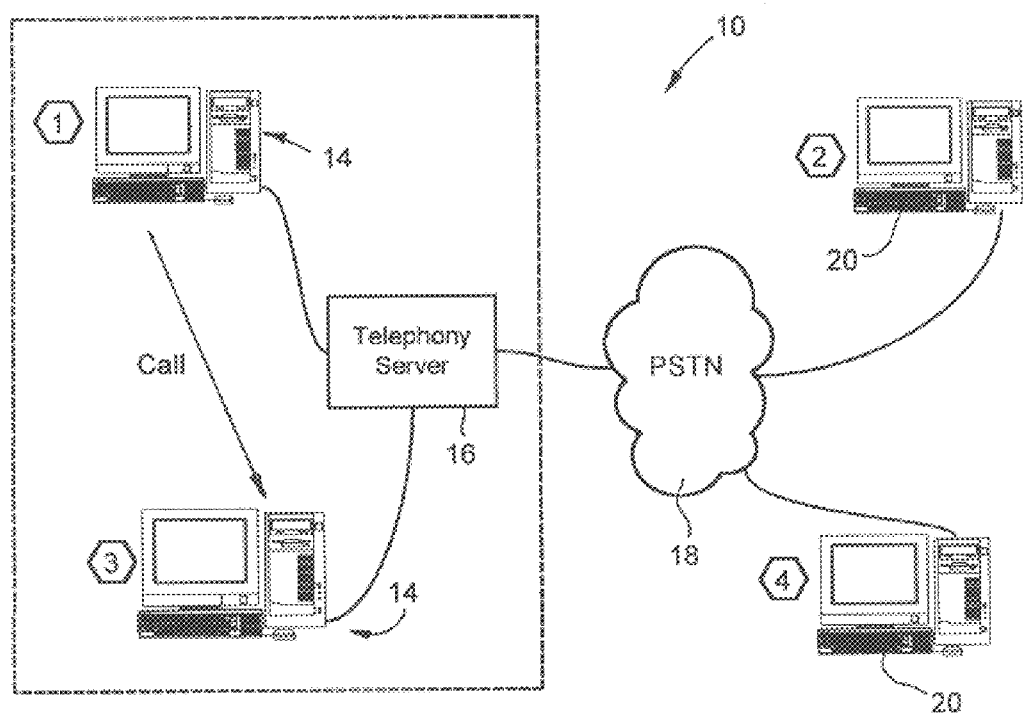
FIG. 1 is a schematic diagram of a communication system including a plurality of user locations.

Referring to FIG. 1, a communication system is shown and is generally indicated to by reference numeral 10. In this example, communication system 10 includes a business location 12 having a plurality of personal computers 14, two of which are shown for illustrative purposes, connected to a telephony server 16 over a local area network. Telephony server 16 is connected to a telephone network 18 such as a public switched telephone network (PSTN). Personal computers 20 at customer locations are also connected to the telephone network 18. Each personal computer 14 and 20 is equipped with the necessary communication hardware and software to allow telephone calls with other communication devices to be established.

The hardware and software resources of the personal computers 14 and 20, which allow them to function as desktop feature telephone devices, provide users with telephone features offering enhanced functionality. These features may be programmed by users of the personal computers, or established by the administrator of the business location 12 or developer of the communication system 10. The features available to each personal computer are listed in precedence and compatibility matrices stored in memory. At the business location 12, the precedence and compatibility matrices are stored in telephony server memory while at the customer locations, the precedence and compatibility matrices are stored in resident memory within the personal computers 20. The precedence and compatibility matrices define rules governing the selection of features to deal with conflicting and compatible features thereby to allow services to be performed in response to events. Specifically, entries in the precedence matrix determine a user's preference when two or more conflicting features are available to the user that can be executed at the same time in response to an event. Entries in the compatibility matrix determine mutually compatible features, which are to be executed simultaneously in response to an event.

Different levels of rules corresponding to different levels of users in the communication system 10 (most common at business locations) can exist as shown in FIG. 2. In this case, rules created by a user of a higher priority cannot be overridden by a user of lower priority. Rules use an if-then representation and may include simple arithmetic operators. Variables are indicated by the "?" prefix and every other symbol is a terminal. The execution model for rules follows that of a typical forward chaining expert system such as OPS-5. The only extension made is that rules are to be executed in phases where indicated. The rules in phase 1 are applied before those in phase 2, etc., until no more rules can be found. The execution then proceeds to the next phase. In this way, the result of the application of the set of rules from one phase is "piped" into the set of rules from the subsequent phase.

The personal computers allow features to be plugged into the communication software framework at design time and run time. Since users can plug new features into the communication software framework, new features can be added, which conflict with existing features. A conflicting feature interaction is flagged when more than one feature can be executed in response to an event and the feature execution outcome is potentially indeterminate. Usually, the precedence and compatibility matrices will not have entries defining rules to resolve conflicts arising as a result of features added by end users. If the feature interaction cannot be resolved by the defined rules, an adaptive rule-based mechanism is invoked, which prompts the user of the personal computer to make a feature selection.

In the present embodiment, the feature extension concept is based on a representation of features as condition-action rules. In a condition-action rule, each condition defines a precondition for applying a feature. Extensions are similar to specializations in object-oriented programming where a subclass extends the behavior of a superclass by adding attributes and operations. In the present invention, an extension defines an alternative flow of execution of a feature.

Extensions are defined by assertions having a syntax similar to Prolog and generally take the form:

assertion(arg1,arg2, . . . , argN)

Assertions defining extensions take the form:

extends(feature2,feature1)

where feature 2 extends feature 1 and is executed instead of feature 1.

Assertions defining mutually compatible features take the form:

compatible(feature3,feature1)

where feature 3 and feature 1 are compatible and are executed in conjunction in response to an event.

For example, consider the terminating call (TC), call forwarding busy (CFB) and call waiting (CW) features. Each of these features can be invoked in response to an incoming call event and triggers on the same precondition, namely "no connection available". The CFB and CW features are both extensions of the TC feature and define alternative actions to be taken when an incoming call event occurs and no connection is available instead of performing the typical reject call procedure. The CFB and CW features take the form:

extends(CFB,TC)

extends(CW,TC)

Figure 3:
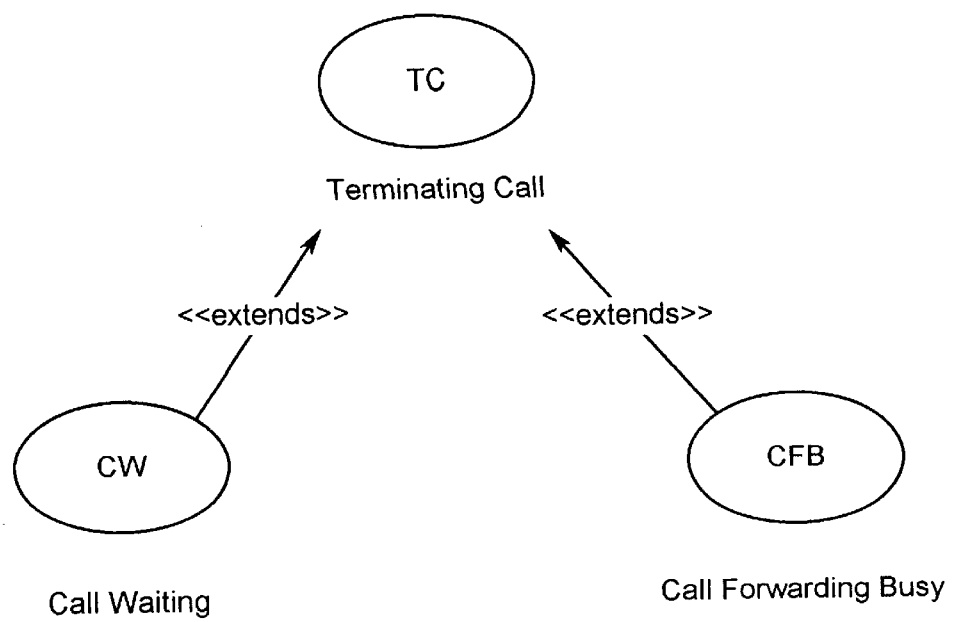
FIG. 3 is a use case diagram showing a terminating call feature extended by call forwarding busy and call waiting features.

FIG. 3 illustrates the concept of "extension" between use cases. Each feature is represented by a use case, shown as an ellipse. Both CW and CFB features are shown to extend the TC feature (the "extends" arrow points at the feature being extended). The TC use case describes the normal flow of behavior for processing an incoming call. The CW and CFB use cases describe exceptional flows to pursue when certain preconditions are satisfied in the TC use case.

Each extension applies at a specific point (or checkpoint) in the extended use case. At this point, a precondition associated with the extension is tested and, when satisfied, the corresponding exceptional flow is followed. When an exceptional flow is completed, it resumes the normal flow of the extended use case from the checkpoint. At this stage, a check for a postcondition is made to ensure successful completion of the exceptional flow. The unsuccessful completion of an exceptional flow may trigger another exceptional flow, in turn. As extensions to use cases can themselves be extended, features can further extend other features that themselves extend features. The last feature in the extension chain receives relative priority over the others.

Figure 4:
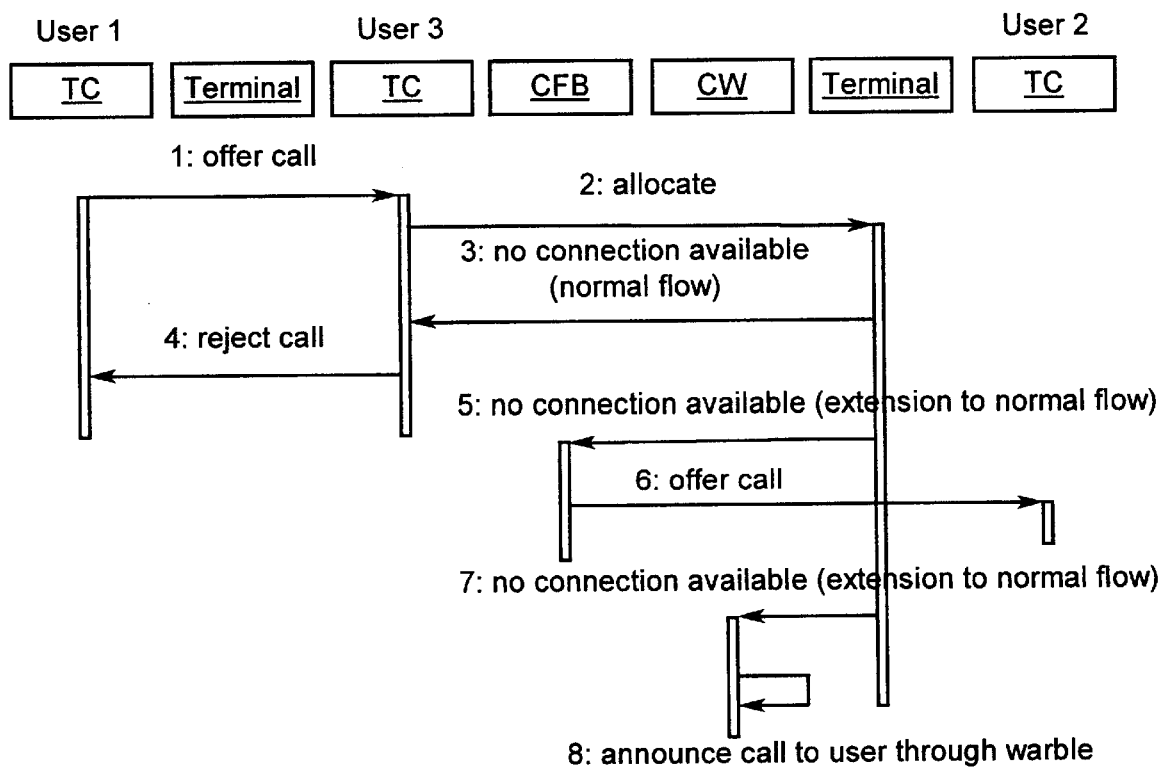
FIG. 4 illustrates the steps performed during a handle incoming call service for terminating call, call forwarding busy and call waiting features.

FIG. 4 illustrates the situation where all three actions prescribed by the TC, CFB and CW features can be pursued. The normal action in response to receiving an incoming call when no connection is available is to reject the call following execution of the TC feature (action 4). If the CFB and the CW features are active, the incoming call can be handled either by forwarding the call (action 6) or announcing the call to the user through a warble (action 8). Only one of these later two actions should be pursued since their effects conflict with each other. The incoming call cannot both be forwarded and announced at the same time.

As mentioned above, typically entries in the preference and compatibility matrices define the rules, which determine the feature or features to be executed in the event of a feature conflict. An example of a precedence matrix is shown below for the CFB and CW features. In this preference matrix, a "1" entry signifies that a feature precedes another feature while a "0" entry signifies a feature that is preceded by another feature. Thus, in this example, the CFB feature precedes the CW feature.

$$\begin{array}{c} \phantom{XXX} CFB \phantom{X} CW \\ \begin{array}{c} \\ CFB \\ CW \\ \phantom{X} \end{array} \left| \begin{array}{cccc} \ldots & \ldots & \ldots & \ldots \\ \ldots & - & 1 & \ldots \\ \ldots & 0 & - & \ldots \\ \ldots & \ldots & \ldots & \ldots \end{array} \right| \end{array}$$

Accordingly, this precedence matrix defines the precedence rule:

precedes(CFB,CW)

Also as mentioned above, features may be mutually compatible in which case they are expected to be executed in conjunction. Although not shown, the compatibility matrix is of a form similar to the precedence matrix. Entries therein define rules establishing features that can be executed in conjunction. For example, a billing feature can be executed in conjunction with the TC, CFB and CW features since the billing feature executes in a service different than the handle incoming call service. In this example, the compatibility matrix defines the compatibility rule:

compatible(?any,billing)

As will be appreciated, the rules defined by the precedence and compatibility matrices governing how features are to be handled, can be different for different users depending on their preferences.

When an event occurs and two or more conflicting features can be executed in response to an event, the adaptive rule-based mechanism is invoked to resolve the conflict. In the communication system 10, telephony server 16 invokes the adaptive rule-based mechanism when a conflicting feature interaction in one of the personal computers 14 is determined. The personal computers 20 invoke the adaptive rule-based mechanism when a conflicting feature interaction is determined at the customer locations.

Figure 5A:
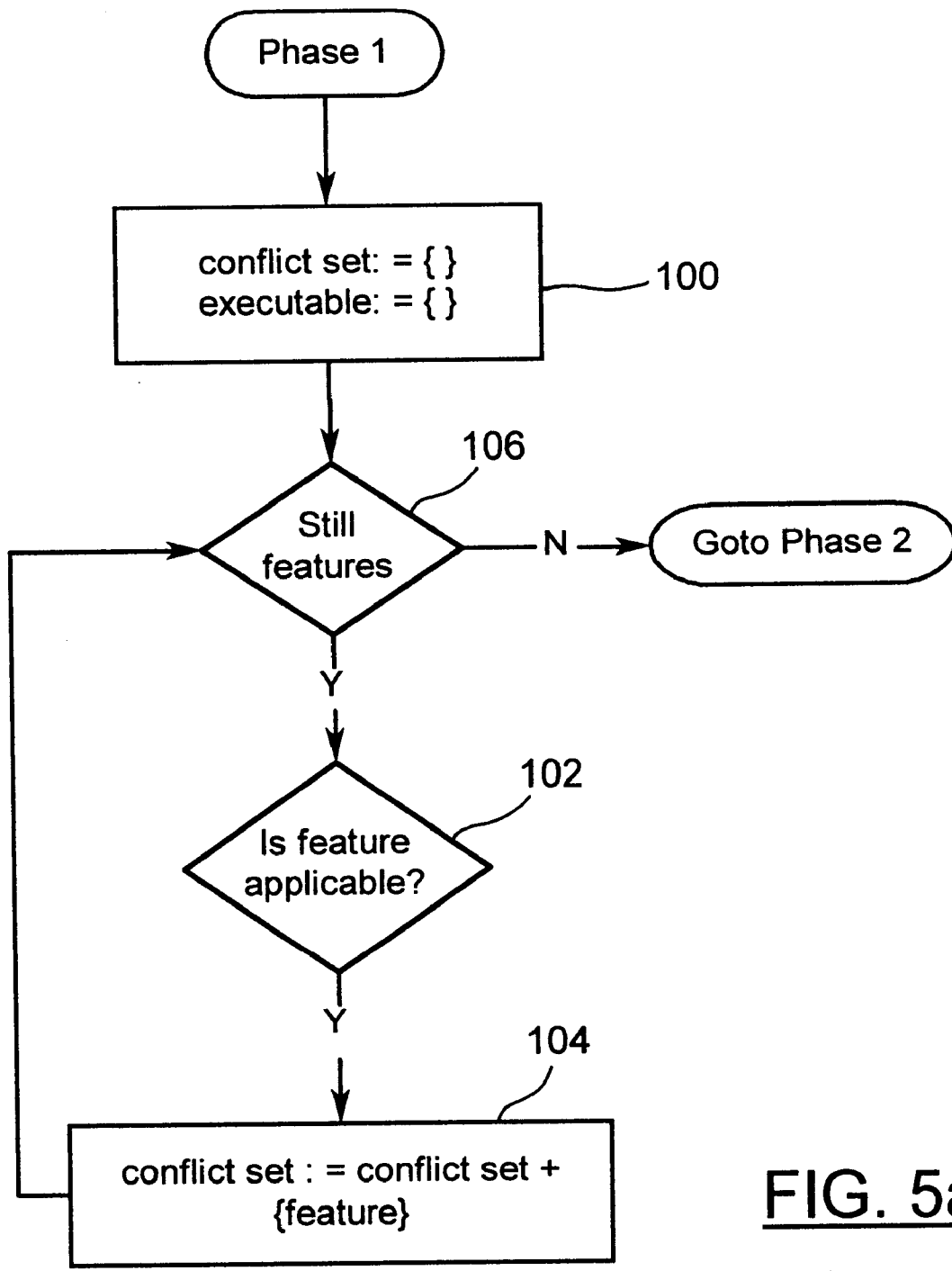
FIGS. 5a to 5c are flow charts illustrating the steps performed during execution of an adaptive rule-based mechanism for resolving conflicting feature interactions in accordance with the present invention.
Figure 5B:
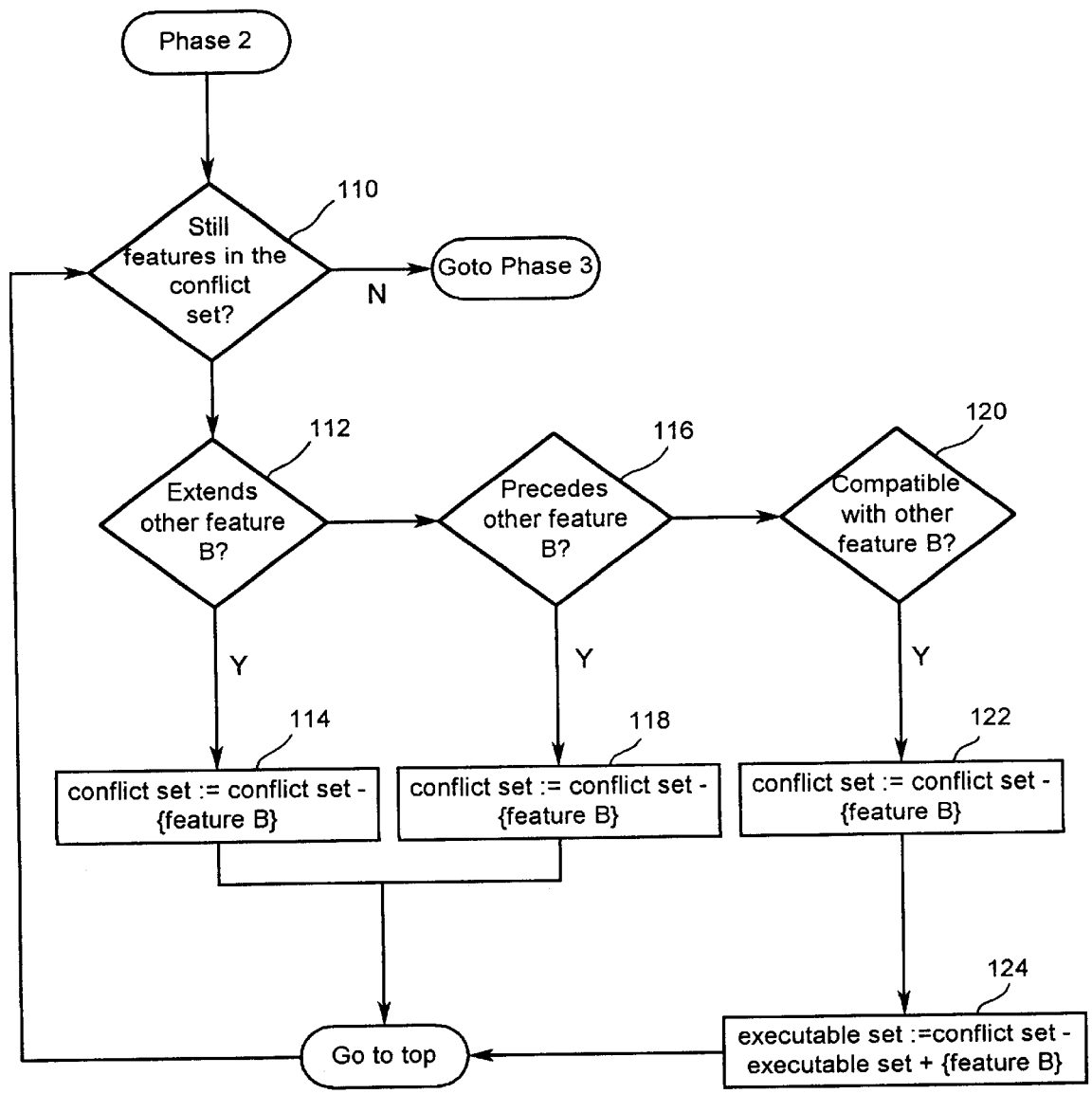
Figure 5C:
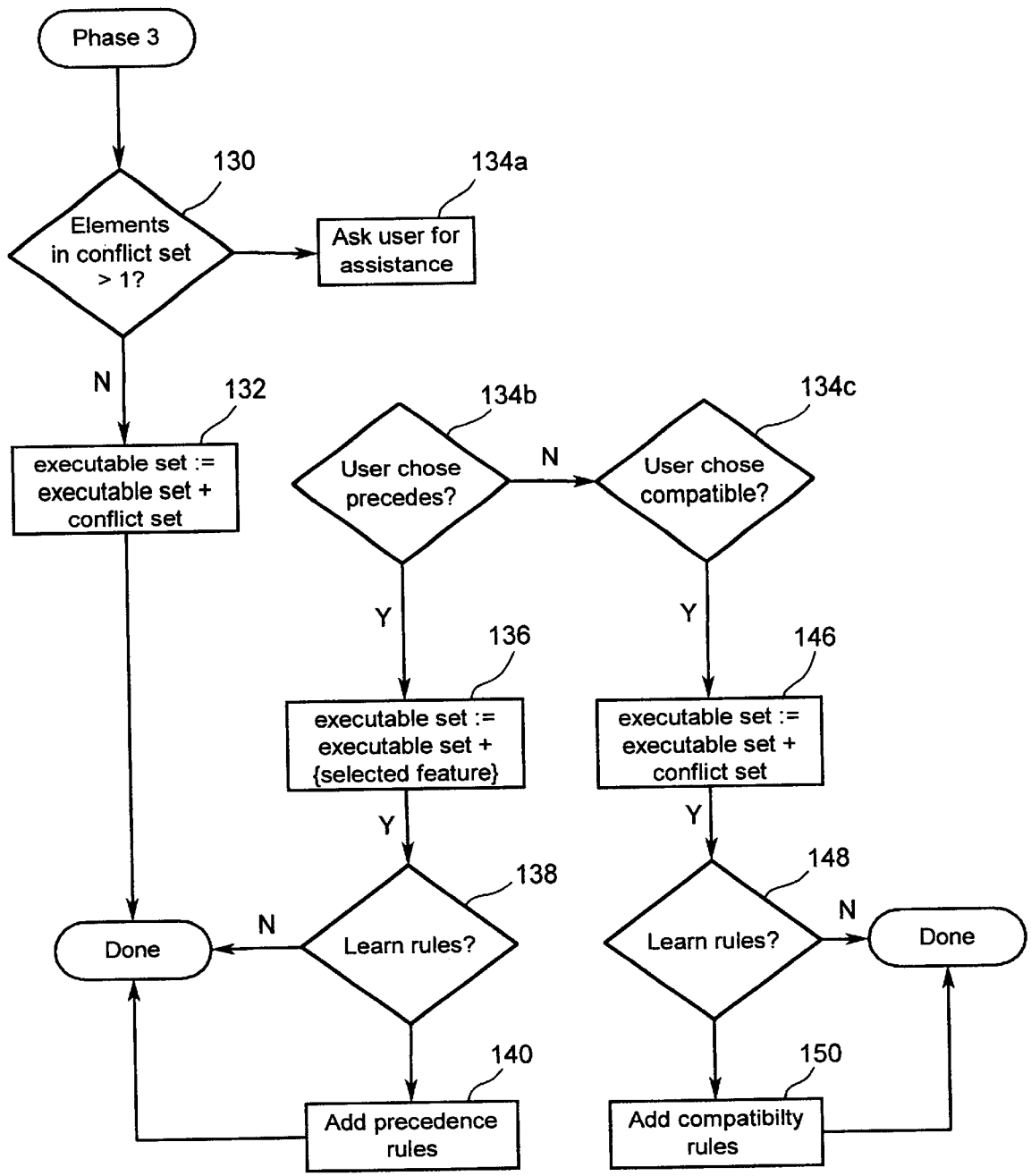

Turning now to FIGS. 5*a* to 5*c,* the steps performed by the adaptive rule-based mechanism to resolve conflicts are shown. As can be seen, the adaptive rule-based mechanism implements a three-phase process to resolve conflicting feature interactions. At phase 1 (see FIG. 5*a*), conflicts between features are determined. Initially, a conflict set and an executable set are opened (block 100). The features associated with the service to be performed in response to the event are then examined to determine if they are applicable to the service to be performed (block 102). If the feature is applicable to the service, the feature is added to the conflict set (block 104). This process is performed until all of the of the features have been examined (block 106).

Once execution of phase 1 has been completed, phase 2 of the adaptive rule-based mechanism is executed (see FIG. 5*b*). At phase 2, the conflict set is examined to determine if more than one feature is in the conflict set (block 110). If more than one feature is in the conflict set, each feature in the conflict set is examined to determine if it extends other features in the conflict set (block 112). If a feature extends other features, the extended features are removed from the conflict set (block 114). If features in the conflict set exist that are not extended by another feature, the precedence rules are examined to determine if any feature precedes other features in the conflict set (block 116). Features preceded by a feature are removed from the conflict set (block 118). If features in the conflict set exist that are not extended or preceded by another feature, the compatibility rules are examined to determine if features in the conflict set are compatible with other features in the conflict set (block 120). If features are compatible with other features, they are removed from the conflict set (block 122) and are added to the executable set (block 124).

Figure 8:
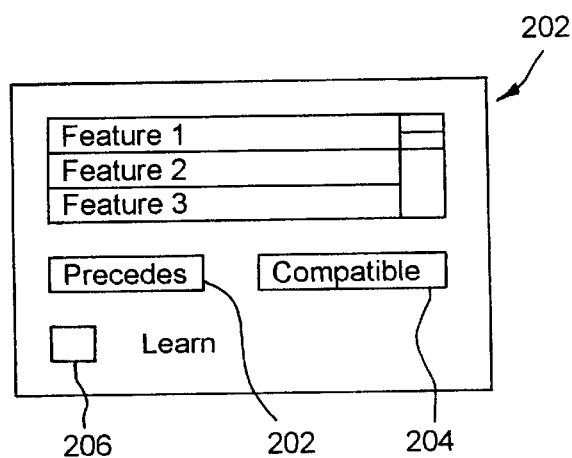
FIG. 8 is a pop-up dialog box presented to a user during execution of the adaptive rule-based mechanism for resolving conflicting feature interactions.

Once the above steps have been performed for all of the features in the conflict set, phase 2 is complete and phase 3 of the adaptive rule-based mechanism is commenced (see FIG. 5*c*). At phase 3, the conflict set is examined to determine if more than one feature exists (block 130). If only one feature exists, the feature is added to the executable set (block 132). The adaptive rule-based mechanism is then exited and the feature or features in the executable set are executed to complete the service to be performed. If more than one feature exists in the conflict set, a pop-up dialog box 200 (see FIG. 8) showing a list of the features in the conflict set is presented to the user. The pop-up dialog box 200 allows the user to select a feature in the conflict set and indicate that it precedes the other feature(s) by selecting the "precedes" button 202 or indicate that the features are compatible by selecting the "compatible" button 204 (blocks 134*a,* 134*b* and 134*c*). The user can also indicate whether the selection is to be learned for future use by selecting the "Learn" checkbox 206.

If the user selects a feature to precede the other feature(s), the selected feature is added to the executable set (block 136). The user can add a precedence rule to the precedence matrix corresponding to the selected feature by selecting the Learn checkbox 206 (block 138). If a precedence rule is to be added, the precedence matrix is updated (block 140) and the adaptive rule-based mechanism is exited. The feature or features in the executable set are then executed to complete the service to be performed. If the user decides not to add a precedence rule to the precedence matrix, the adaptive rule-based mechanism is exited. The feature or features in the executable set are then executed to complete the service to be performed.

If the user indicates that the features are compatible, the conflict set is added to the executable set (block 146). The user can add a compatibility rule to the compatibility matrix corresponding to the selection by selecting the Learn checkbox 206 (block 148). If a compatibility rule is to be added, the compatibility matrix is updated (block 150) and the adaptive rule-based mechanism is exited. The features in the executable set are then executed to complete the service to be performed. If the user decides not to add a compatibility rule to the compatibility matrix, the adaptive rule-based mechanism is exited. The features in the executable set are then executed to complete the service to be performed.

The feature interaction resolution process described above with reference to FIGS. 5*a* to 5*c* is also shown in Appendix A.

As will be appreciated, if the user adds precedence and compatibility rules to the precedence and compatibility matrices, the next time a conflict is encountered between the conflicting features, the new rule will be applied and it will not be necessary to prompt the user for assistance. The adaptive rule-based mechanism will have "remembered" the user's preference without requiring explicit programming by the end user.

An example of the above-described process to resolve conflicts will now be described for a handle incoming call service where the TC, CFB and CW features are all part of the service and where the billing feature is compatible with the features in the service. The assertions set forth below define the above:

service(handle-incoming-call, {TC, CFB, CW, billing})
    extends(CFB, TC)
    extends(CW, TC)
    compatible(?any, billing)

The assertions below describe the situation when an incoming call is placed by a user Joanne to a user Michael and there is no connection available:

user(Michael)
    user(Joanne)
    terminal(terminal-1)
    terminal(terminal-2)
    attached(terminal-1, michael)
    busy(terminal-1)
    attached(terminal-2, joanne)
    busy(terminal-2)
    incoming-call(joanne, michael)

The following rules describe the features of the handle incoming call service that are activated by a busy condition:

;; Terminating Call
        if busy(?terminal) and
        incoming-call(?source, ?destination) and
        terminal(?terminal) and
        user(?source) and
        user(?destination) and
        attached(?terminal, ?destination)
        then reject-incoming-call(?source, ?destination)
    ;; Call Forwarding Busy
        if busy(?terminal) and
        incoming-call(?source, ?destination) and
        terminal(?terminal) and
        user(?source) and
        user(?destination) and
        attached(?terminal, ?destination)
        then forward-incoming-call(?source, ?destination)
    ;; Call Waiting
        if busy(?terminal) and
        incoming-call(?source, ?destination) and
        terminal(?terminal) and
        user(?source) and
        user(?destination) and
        attached(?terminal, ?destination)
        then announce-incoming-call(?source, ?destination, warble)

Since the CFB and CW features conflict, the adaptive rule-based mechanism is invoked to resolve the conflict. During the conflict resolution process, the following intermediary results will be observed after the completion of each phase:

Phase 1:
    After applying the "applicable" rule (block 102):
        ?conflict-set={TC, CFB, CW, billing}
        ?executable-set={ }
Phase 2:
    After applying the "extends" rule (blocks 112 and 114):
        ?conflict-set={CFB, CW, billing}
        ?executable-set={ }
    After applying the "precedes" rule (blocks 116 and 118):
        ?conflict-set={CFB, CW, billing}
        ?executable-set={ }
    After applying the "compatible" rule (blocks 120 and 122):
        ?conflict-set={CFB, CW}
        ?executable-set={billing}
Phase 3:
    After applying the "size" rule (block 130), the user is then asked to select the feature in the conflict set {CFB, CW} which precedes the other (there could of course be more than one other feature) or to indicate that the features are mutually compatible.

If the user selects the CFB feature at block 134b and the learn option at block 138 to signify that the feature selection should be remembered, the following assertion is generated:

user-selection({CFB, CW}, precedes, CFB, learn)

After applying the "user-selection" assertion:
        ?conflict-set={ }
        ?executable-set ={billing, CFB}
    The following rule is then generated and added to the precedence matrix:

precedes(CFB, CW)

As will be appreciated, after the adaptive rule-based mechanism is invoked, feature interactions are resolved allowing services to be performed. If desired, rules can be established to govern feature selection when the same services are to be performed in the future. Since feature interactions are resolved in an adaptive manner, different users can establish their own preferences.

Rather than presenting the list of features in the conflict set to the user in a pop-up dialog box, and prompting the user to select whether a feature precedes other features or is compatible with other features at blocks 134a, 134b and 134c, alternatives are available. For example, before presenting the list of features in the conflict set to the user, the list of features in the conflict set can be filtered using the level assigned to the user (see FIG. 2) to determine if there are features in the conflict set that have a level above that assigned to the user. For example, in the case of the billing feature, end users are typically not permitted to modify preference rules that involve this feature whereas the system administrator typically is.

Figure 6:
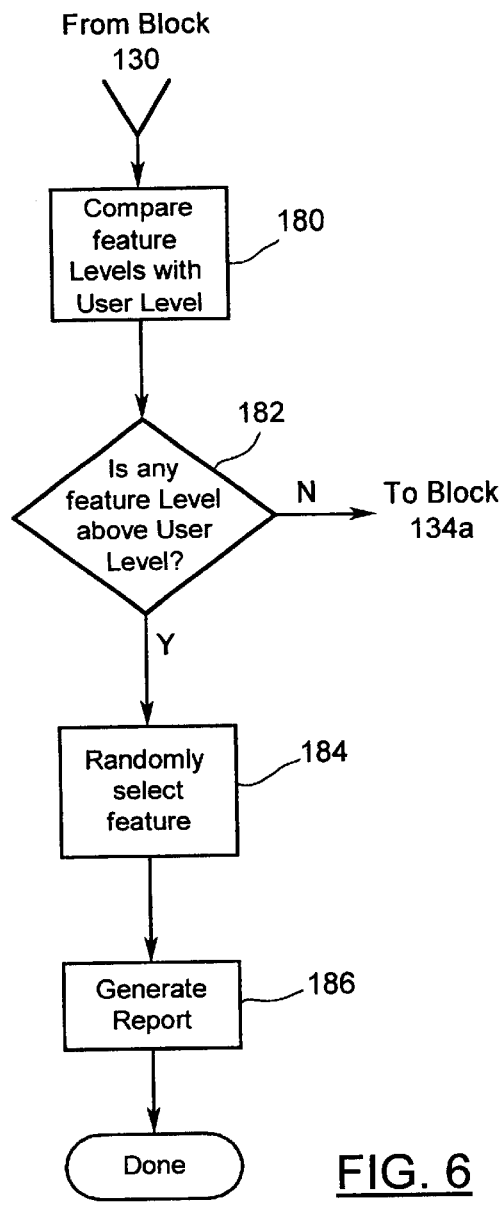
FIG. 6 is a flow chart illustrating steps performed during filtering of conflicting feature interactions.

FIG. 6 shows an extension of the flow chart of FIG. 5c illustrating the steps performed to filter the features in the conflict set in this manner. If at block 130, more than one feature exists in the conflict set, the level assigned to each feature is compared with the level assigned to the user (block 180). If the levels assigned to the features in the conflict set are equal to or below the level assigned to the user, the conflict resolution process proceeds as described previously enabling the user to resolve the conflict completely (block 182). However, if one or more of the features in the conflict set have levels above that assigned to the user, the adaptive rule-based mechanism selects one of the features randomly to precede the other features and adds the feature to the executable set (block 184). The adaptive rule-based mechanism then generates a report for the system administrator (block 186) before exiting. Once exited, the feature or features in the executable set are executed to complete the service to be performed.

In an alternative embodiment, at blocks 134a, 134b and 134c the list of features in the conflict set is converted to a voice message and presented audibly to the user rather than visually via the pop-up dialog box. It has been found that users often lack the technical sophistication to select a feature from a list. The features in the conflict set can be presented either to the user of the feature telephone device or an external party, such as for example a customer calling into a call center, with appropriate prompts to select a feature by pressing a number key on the user's feature telephone device to generate a DTMF tone. When the features are presented to the user of the feature telephone device, the voice message prompts are similar to the features in the conflict set. For example, the voice message prompts may take the form:

Press 1 to select call forward when busy
Press 2 to select call waiting
Press 3 to select call forward to voice mail When the features are presented to the external party, it is preferred that the voice message provides meaningful information rather than using the technical names of the features. For example, the voice message prompts to the external party may take the form:

Press 1 if you want to be forwarded to another service representative
Press 2 if you want to be forwarded to voice mail.

When the user of the feature telephone device or the external party selects a feature by entering the appropriate digit thereby to generate the DTMF tone, the feature is selected by the adaptive rule-based mechanism and added to the executable set. The adaptive rule-based mechanism then proceeds as described previously.

Figure 7:
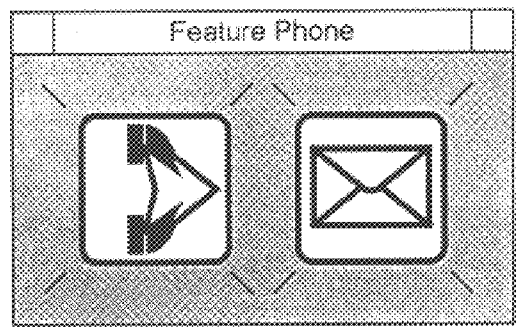
FIG. 7 illustrates user selectable icons representing conflicting features.

In yet another embodiment, rather than presenting the features in the conflict set in a list within the pop-up display box, the list of features in conflict set can be presented as user selectable icons (see FIG. 7). As can be seen each icon provides a visual representation of the associated feature. Preferably, the icons flash forcing the user to select an icon to resolve the conflicting feature interaction. The use of icons over a list is likely to be more manageable and intuitive to the end user. However, in order for the icons to present visual representations of the associated features, conflicting feature interactions must be anticipated during design.

In still yet another embodiment, features are mapped to canned message fragments presented audibly to an external party to encode a policy to deal with message types. The mapping in this case is represented as set of production rules similar in form to the rules previously described. For example, in the case of business location 12, there may be a policy to ensure personal calls routed to a call center agent do not interrupt customer calls and to ensure customer calls are not routed to voice mail. In this case, when an external party calls the business location, the external party is presented with the following canned messages:

Press 1 if this is a personal call
Press 2 if this is a business call

Based on the selection made by the external party, the production rules are used by the adaptive rule-based mechanism to resolve conflicting features in a manner which follows the encoded policy. In the above example, production rules to ensure personal calls do not interrupt business calls and to ensure business calls do not get routed to voice mail take the form:

If includes(?conflict-set, call-forwarding-busy)
And user-selection(?x)
And message-fragment(?x, "if this is a personal call")
Then remove-from-conflict-set(?conflict-set, call-forwarding-busy)

If includes(?conflict-set, voicemail)
And user-selection(?x)
And message-fragment(?x, "if this is a business call")
Then remove-from-conflict-set(voicemail)

These production rules test if a certain feature is in the conflict set, and if the external party has selected an option corresponding to a specified message fragment (as determined by the DTMF tone). If the condition part of a rule is satisfied, the feature is removed from the conflict set thereby to enforce the stated policy.

Although the present invention has been described with particular reference to the resolution of conflicting feature interactions in a telephony communication system, those of skill in the art will appreciate that the adaptive rule-based mechanism is not limited to this domain. The present adaptive rule-based mechanism can be extended to virtually any kind of software system where features conflict. For example, the adaptive rule-based mechanism can be incorporated into a word processing application including multiple services such as spell-checking, formatting etc, or a World Wide Web browser.

The adaptive rule-based mechanism can be embodied as computer readable program code on a computer readable medium. The computer readable medium is any data storage device that can store data, which thereafter can be read by a computer system. Examples of the computer readable medium include ROM, RAM, CD-ROM, magnetic tape and optical data storage devices.

Those of skill in the art will also appreciate that variations and modifications may be made to the present invention without departing from the spirit and scope thereof as defined by the appended claims.

Appendix A

;; Phase 1
  if applicable(?feature)
  then add-to-conflict-set(?conflict-set, ?feature)
;; Phase 2a
  if extends(?featureA, ?featureB)
  then remove-from-conflict-set(?conflict-set, ?featureB)
;; Phase 2b
  if precedes(?featureA, ?featureB)
  then remove-from-conflict-set(?conflict-set, ?featureB)
;; Phase 2c
  if compatible(?featureA, ?featureB)
  then remove-from-conflict-set(?conflict-set, ?featureB)
    and
  add-to-executable-set(?executable-set, ?featureB)
;; Phase 3
  if size(?conflict-set)=1
  then merge(?executable-set, ?conflict-set) and
  clear(?conflict-set)
  if size(?conflict-set)>1
  then ask-user-to-select(?conflict-set, ?feature)
  if user-selection(?conflict-set, precedes, ?feature, learn)
  then add-to-executable-set(?executable-set, ?feature)
    and
  for all ?x<>?feature in ?conflict-set:
  add-rule (precedes(?feature, ?x)) and Appendix A (con't)

clear(?conflict-set)
if user-selection(?conflict-set, precedes, ?feature, only-once)
then add-to-executable-set(?executable-set, ?feature)

clear(?conflict-set)
if user-selection(?conflict-set, compatible, ?feature, learn)
then merge(?executable-set, ?conflict-set)
for all ?x<>?feature in ?conflict-set:
add-rule (compatible(?feature, ?x)) and
clear(?conflict-set)
if user-selection(?conflict-set, compatible, ?feature, only-once)
then merge(?executable-set, ?conflict-set)
clear(?conflict-set)

We claim:

1. In a system where two or more indeterminate features can be executed in response to an event resulting in a conflicting feature interaction, an adaptive rule-based method for resolving said conflicting feature interaction comprising the steps of:

determining indeterminate features available for execution in response to an event;

examining said indeterminate features to determine whether one of said indeterminate features takes priority over other indeterminate features;

if one of said indeterminate features takes priority, selecting said one indeterminate feature for execution; and if one of said indeterminate features does not take priority, prompting a user to select one of said indeterminate features for execution thereby to resolve said conflicting feature interaction.

2. The method of claim 1 wherein during said examining step, rules are examined to determine if one of said indeterminate features takes priority over other indeterminate features.

3. The method of claim 2 wherein said rules are user programmable.

4. The method of claim 3 wherein during said prompting step, said user is prompted either to select one indeterminate feature for execution or indicate that the indeterminate features are compatible, if said indeterminate features are indicated as being compatible, all of said indeterminate features being selected for execution in conjunction.

5. The method of claim 4 further comprising the step of prompting said user to decide if a rule is to be established corresponding to the selected one indeterminate feature or the feature compatibility indication.

6. The method of claim 5 wherein during said determining step, said indeterminate features are placed in a conflict set, when one of said indeterminate features is determined to take priority over the other indeterminate features, the other indeterminate features are removed from said conflict set.

7. The method of claim 6 wherein during said examining step, said conflict set is examined to determine:

whether any of the indeterminate features extend other indeterminate features;

whether any of the indeterminate features take precedence over other indeterminate features in accordance with a set of precedence rules; and whether any indeterminate features are compatible with other indeterminate features in accordance with a set of compatibility rules, indeterminate features extended and preceded by other indeterminate features being removed from said conflict set and indeterminate features compatible with other indeterminate features being removed from said conflict set and placed in an executable set.

8. The method of claim 1 wherein said indeterminate features represent executable options to be performed to complete a service.

9. The method of claim 8 wherein said service relates to a procedure performed during a telephone communication session.

10. The method of claim 1 wherein during said prompting, said indeterminate features are represented as user selectable icons presented to said user on a device.

11. The method of claim 10 wherein said user selectable icons flash.

12. The method of claim 10 wherein said device is a computer telephone device having a monitor with a display screen.

13. In a telephony communication system wherein a service is to be performed in response to an event, said system including a plurality of executable conflicting features representing available options which can be performed to complete said service, an adaptive rule-based method to resolve feature conflicts during performance of said service comprising the steps of:

determining the conflicting features available for execution;

examining said conflicting features to determine whether one of said conflicting features takes priority over other conflicting features;

if one of said conflicting features takes priority, executing said one conflicting feature thereby to complete said service; and if one of said conflicting feature does not take priority, prompting a user to select one of said conflicting features for execution to resolve said conflicting feature interaction and executing the selected conflicting feature thereby to complete said service.

14. The method of claim 13 wherein during said examining step, rules are examined to determine if one of said conflicting features takes priority over other conflicting features.

15. The method of claim 14 wherein said rules are user programmable.

16. The method of claim 15 wherein during said prompting step, said user is prompted either to select one conflicting feature for execution or indicate that the conflicting features are compatible, if said conflicting features are indicated as being compatible, said conflicting features being executed in conjunction.

17. The method of claim 16 further comprising the step of prompting said user to decide if a rule is to be established corresponding to the selected conflicting feature or feature compatibility indication.

18. The method of claim 13 wherein during said prompting, said conflicting features are presented to said user in a voice message.

19. The method of claim 18 wherein said conflicting features are selectable by dialing digits to generate corresponding DTMF tones.

20. The method of claim 19 wherein said service is the completion of a telephone call from a calling party to a called party and wherein said voice message is presented to said calling party.

21. The method of claim 19 wherein said service is the completion of a telephone call from a calling party to a called party and wherein said voice message is presented to said called party.

22. An adaptive rule-based mechanism to resolve conflicting feature interactions when a plurality of conflicting features can be executed simultaneously in response to an event, said mechanism comprising:

means for determining conflicting features available for execution in response to said event;

means for examining said conflicting features to determine whether one of said conflicting features takes priority over other conflicting features;

means for selecting the conflicting feature that takes priority for execution, if it exists; and means for prompting a user to make a selection to resolve said conflicting feature interaction if a conflicting feature taking priority does not exist.

23. The mechanism as defined in claim 22 wherein said examining means examines rules to determine if one of said conflicting features takes priority over said other conflicting features.

24. The mechanism as defined in claim 23 further including means for adding a rule corresponding to the selection made by said user.

25. In a system where two or more indeterminate features can be executed in response to an event resulting in a conflicting feature interaction, an adaptive rule-based method for resolving said conflicting feature interaction comprising the steps of:

determining indeterminate features available for execution in response to an event;

examining said indeterminate features to determine whether one of said indeterminate features takes priority over other indeterminate features;

if one of said indeterminate features takes priority, selecting said one indeterminate feature for execution; and if one of said indeterminate features does not take priority, comparing levels assigned to the indeterminate features with the level assigned to a user associated with said event, if the level assigned to at least one of the indeterminate features is above the level of the user, automatically selecting one of the indeterminate features to resolve the conflicting feature interaction; otherwise prompting the user to make a selection to resolve the conflicting feature interaction.

26. The method of claim 25 further comprising the step logging a report when an automatic feature selection is made.

27. The method of claim 26 when said indeterminate feature is randomly selected during said automatic selection.

28. In a telephony communication system wherein a telephone call completion service is to be performed in response to a telephone call, said system including a plurality of executable conflicting features representing available options which can be performed to complete said service, an adaptive rule-based method to resolve feature conflicts during performance of said service comprising the steps of:

prompting a calling party to select one of a number of options;

determining the conflicting features available for execution;

examining said conflicting features to determine whether one of said conflicting features takes priority over the other conflicting features;

if one of said conflicting features takes priority, executing said one conflicting feature thereby to complete said service; and if one conflicting feature does not take priority, examining rules associated with a policy governing feature selection to determine if the policy rules remove one or more features from the conflict; prompting a user to make a selection from the remaining conflicting features to resolve said conflicting feature interaction; and executing the selected feature thereby to complete said service.

29. A computer readable medium including computer program code for resolving conflicting feature interactions comprising:

computer program code for determining conflicting features available for execution in response to an event;

computer program code for examining said conflicting features to determine whether one of said conflicting features takes priority over other conflicting features;

computer program code for selecting said one conflicting feature for execution if one of said conflicting features takes priority; and computer program code for prompting a user to select one of said conflicting features for execution if one of said conflicting features does not take priority thereby to resolve said conflicting feature interaction.

* * * * *